United States Patent
Rakesh et al.

(10) Patent No.: US 11,237,914 B2
(45) Date of Patent: Feb. 1, 2022

(54) INTELLIGENT HANDLING OF CONSISTENCY LEVEL OF VIRTUAL MACHINES

(71) Applicant: EMC IP Holding Company LLC, Hopkinton, MA (US)

(72) Inventors: Aaditya Rakesh, Bangalore (IN); Sunil Yadav, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 179 days.

(21) Appl. No.: 16/154,123

(22) Filed: Oct. 8, 2018

(65) Prior Publication Data

US 2020/0110668 A1    Apr. 9, 2020

(51) Int. Cl.
G06F 9/44       (2018.01)
G06F 11/14      (2006.01)
G06F 9/455      (2018.01)

(52) U.S. Cl.
CPC ...... *G06F 11/1451* (2013.01); *G06F 9/45558* (2013.01); *G06F 2201/815* (2013.01); *G06F 2201/84* (2013.01)

(58) Field of Classification Search
None
See application file for complete search history.

(56) References Cited

U.S. PATENT DOCUMENTS

| 9,740,577 B1* | 8/2017 | Chakraborty | G06F 11/1451 |
| 2010/0191952 A1* | 7/2010 | Keinan | G06Q 10/06 |
| | | | 713/100 |
| 2010/0333089 A1* | 12/2010 | Talwar | G06F 11/004 |
| | | | 718/1 |

* cited by examiner

Primary Examiner — Wei Y Zhen
Assistant Examiner — Lanny N Ung
(74) Attorney, Agent, or Firm — Womble Bond Dickinson (US) LLP (57) ABSTRACT

A method of performing backup for a group of virtual machines (VMs) is provided. The method identifies at least a first VM of the group of VMs based on a threshold and removes the at least first VM from the group of VMs such that the group of VMs includes first remaining VMs. The method also initiates creating a first snapshot for the first remaining VMs at the first level of consistency and identifies a failure of creating the first snapshot for at least a second VM of the first remaining VMs. The method further removes the at least second VM from the first remaining VMs such that the group of VMs includes one or more second remaining VMs and creates a second snapshot for the one or more second remaining VMs at the first level of consistency.

20 Claims, 4 Drawing Sheets

INTELLIGENT HANDLING OF CONSISTENCY LEVEL OF VIRTUAL MACHINES

TECHNOLOGICAL FIELD

The present disclosure relates generally to intelligent handling of consistency level of virtual machines, and in particular, to creating snapshots for different virtual machines at different levels of consistency.

BACKGROUND

A hypervisor or virtual machine monitor (VMM) is computer software, firmware or hardware that creates and runs virtual machines (VMS). A computer on which a hypervisor runs one or more VMs can be a server (also can be referred to as a host machine), and each VM hosted by the hypervisor can be referred to as a guest machine or guest VM. Backup operations for VMs currently involve taking a snapshot with a designated consistency for the VMs. For example, when performing data backup for a VM hosted by a hypervisor, a backup application installed on the hypervisor can attempt to create a snapshot (i.e., an image of the VM at a point of time) for the VM at an application consistency. However, the backup application may not be able to create a snapshot for the VM at the application consistency due to certain reasons, e.g., the VM is not in running state. Thus, the backup application may need to create a snapshot for the VM at a different level of consistency such as at a crash consistency.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Example implementations of the present disclosure are generally directed to intelligent handling of consistency level of virtual machines, and in particular, to creating snapshots for different virtual machines at different levels of consistency. Example implementations can intelligently identify the applicable level(s) of consistency for creating a snapshot for different VMs. Example implementations can create a snapshot at an application consistency for some of the VMs in a group of VMs and remove other VMs from the group. Example implementations can create a snapshot at a crash consistency for the other VMs removed from the group. In this way, example implementations can create snapshots on the basis of the applicable level(s) of consistency for different VMs. Example implementations do not need customer or user intervention to create different backup schedules and policies for different VMs based on their different applicable levels of consistency.

Example implementations can provide an intelligent solution to handle consistency level for VMs. Based on a weighted scoring mechanism, example implementations can determine which VM(s) among multiple VMs is unsuitable for a backup at an application consistency. If the score of a VM exceeds the threshold in the weighted scoring mechanism, such a VM (may be referred to as an invalid VM) can be removed from the multiple VMs or grouped differently than other VMs of the multiple VMs. When a snapshot is taken for the remaining VMs of the multiple VMs at the application consistency, it may fail on one or more VMs (may be referred to as unsuccessful VMs) due to various reasons. These unsuccessful VMs can be then removed from the remaining VMs of the multiple VMs. At this stage, example implementations can take 2 snapshots. One snapshot can be taken for the final remaining VMs (after removing the invalid VMs and the unsuccessful VMs) of the multiple VMs with application consistency. Another snapshot can be taken for the invalid VMs and/or unsuccessful VMs with crash consistency.

Example implementations can provide partial failure support for Windows Server 2016 resilient change tracking (RCT) based backup operations. Windows 2016 Server introduces the concept of VM grouping which allows taking a collective snapshot (or checkpoint) for a group of VMs. However, conventionally, partial failure is not supported in Windows Server 2016 RCT based backup operations using VM grouping. That is, if a snapshot cannot be created for even a single VM in a group of VMs, the creation of snapshot for the entire group fails and all VMs in that group are excluded from data backup. Existing solutions include taking individual snapshot for each VM in the group, failing all VMs of the group and repeating the backup operations for the group, or creating different backup policies for different VMs by a user or customer. These existing solutions may cause data loss or backup failure that may result in an overall increase in the backup time window. Example implementations can provide partial failure support for Windows Server 2016 RCT based backup operations. In one example implementation, if the snapshot cannot be created for one or more VMs in a group at an application consistency, the backup operation does not fail but can identify and remove the failed one or more VMs from the group. The backup operation can be continued to create a snapshot for the remaining VMs in the group at the application consistency.

The present disclosure thus includes, without limitation, the following example implementations.

Some example implementations provide a method of performing backup for a group of virtual machines (VMs), the method comprising: identifying at least a first VM of the group of VMs based on a threshold indicating a probability of failure of creating a snapshot for the at least first VM at a first level of consistency; removing the at least first VM from the group of VMs such that the group of VMs includes first remaining VMs; initiating creating a first snapshot for the first remaining VMs at the first level of consistency; identifying a failure of creating the first snapshot for at least a second VM of the first remaining VMs; removing the at least second VM from the first remaining VMs such that the group of VMs includes one or more second remaining VMs; and creating a second snapshot for the one or more second remaining VMs at the first level of consistency.

In some example implementations of the method of any preceding example implementation, or any combination of preceding example implementations, identifying the at least first VM of the group of VMs includes: allocating a plurality of weights to the at least first VM, the plurality of weights indicating a plurality of attributes related to the probability of failure; calculating a summation of the plurality of weights; and comparing the summation to the threshold.

In some example implementations of the method of any preceding example implementation, or any combination of preceding example implementations, the group of VMs is hosted on one or more Microsoft Hyper-V hypervisors including feature of resilient change tracking (RCT).

In some example implementations of the method of any preceding example implementation, or any combination of preceding example implementations, identifying the failure of creating the first snapshot includes receiving information indicating a reason of the failure.

In some example implementations of the method of any preceding example implementation, or any combination of preceding example implementations, removing the at least first VM from the group of VMs includes creating a different group for the at least first VM, and removing the at least second VM from the first remaining VMs includes moving the at least second VM to the different group.

In some example implementations of the method of any preceding example implementation, or any combination of preceding example implementations, further comprising creating a third snapshot for the at least first VM or the at least second VM at a second level of consistency.

In some example implementations of the method of any preceding example implementation, or any combination of preceding example implementations, the first level of consistency is an application consistency, and the second level of consistency is a crash consistency.

Some example implementations provide an apparatus for performing backup for a group of VMs. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for performing backup for a group of VMs. The computer-readable storage medium is non-transitory and has computer-readable program code stored therein that in response to execution by a processor, causes an apparatus to at least perform the method of any preceding example implementation, or any combination of any preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Figure 1:
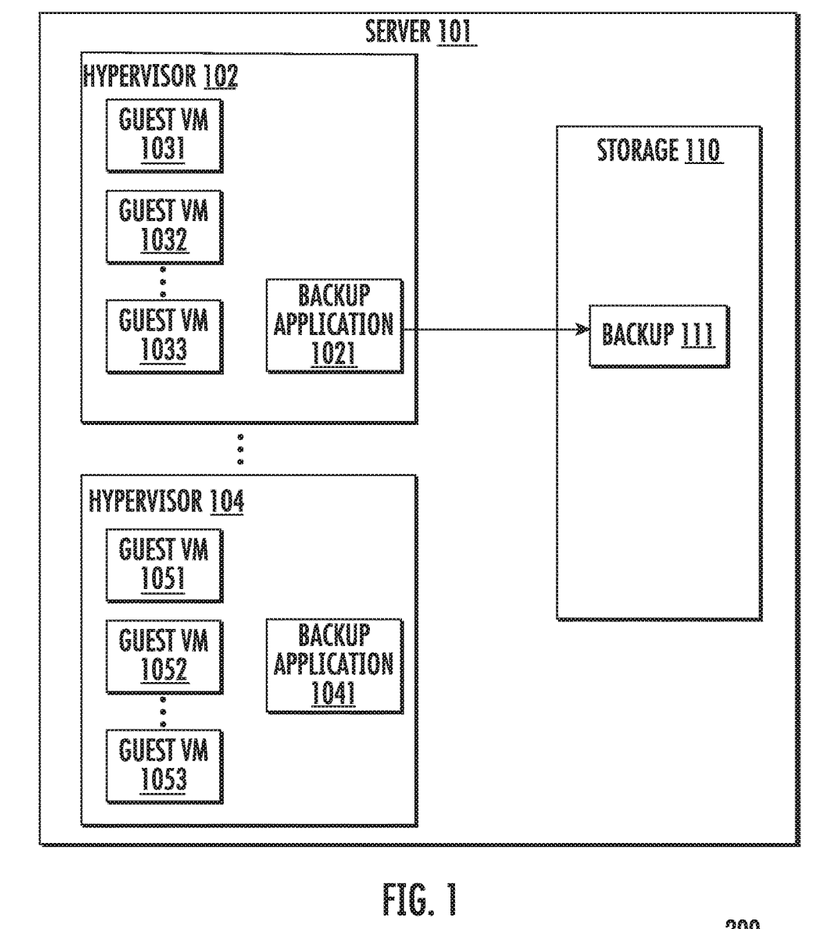
FIG. 1 illustrates a system for performing backup for a group of virtual machines (VMs), according to example implementations of the present disclosure.

FIG. 1 illustrates a system or a server 101 for performing data recovery of a guest VM, according to example implementations of the present disclosure. In some examples, as described in greater detail with reference to FIG. 5, the system or server may be implemented by an apparatus that includes a processor and a memory storing executable instructions. As shown in FIG. 1, in one example, the server 101 can support one or more hypervisors such as the hypervisors 102 and 104. Each hypervisor can host one or more guest VMs. For example, the hypervisor 102 can host multiple guest VMs such as VMs 1031-1033, and the hypervisor 104 can host multiple VMs such as VMs 1051-1053. Each hypervisor can have a backup application installed on the hypervisor such as the backup applications 1021 and 1041 installed on hypervisors 102 and 104 respectively.

In one example, multiple hypervisors such as hypervisors 102 and 104 can form a cluster (e.g., a failover cluster) and share a common storage 110 (e.g., cluster shared volume). The backup application installed on one hypervisor such as the backup application 1021 or 1041 can perform a backup operation to create a snapshot for all VMs (e.g., VMs 1031-1033 and 1051-1053) hosted by the multiple hypervisors in the cluster, regardless of which hypervisor the VMs are running on. In this example, the backup application 1021 may generate a backup or snapshot 111 of all the VMs. The backup 111 can be stored in storage 110 of the server 101.

In one example, a user may want to create a snapshot at an application consistency for all VMs (e.g., VMs 1031-1033 and 1051-1053) hosted by the multiple hypervisors in the cluster. A snapshot is at an application consistency if, in addition to being write-order consistent, running applications complete all their operations and flush their buffers to disk (application quiescing). With a snapshot at the application consistency, when performing data recovery for a VM, the VM can be recovered from the same position or status as when (at the point of time) the snapshot was created for the VM. However, the backup application 1021 or 1041 may not be able to create a snapshot for all the VMs at the application consistency due to certain reasons, e.g., VM 1031 is not in running state and the backup application fails to create the snapshot for VM 1051 at the application consistency. Thus, the backup application may need to create a snapshot for VM 1031 and/or VM 1051 at a different level of consistency such as at a crash consistency. A snapshot is at a crash consistency if all of the interrelated data components are as they were (write-order consistent) at the point of time of a crash (e.g., a power outage occurs). With a snapshot at the crash consistency, when performing data recovery for a VM, some real-time data may be missing in the recovered VM.

The VMs (e.g., VMs 1031-1033 and 1051-1053) hosted by multiple hypervisors (hypervisors 102 and 104) in a cluster may form a group of VMs. In some implementations, the group of VMs is hosted on one or more Microsoft Hyper-V hypervisors including feature of RCT. For example, the hypervisors 102 and 104 can be Microsoft Hyper-V hypervisors including the feature of RCT. That is, data protection for the Microsoft Hyper-V hypervisors can use RCT to track changes to a virtual disk of a VM that occur between backup operations.

In some implementations, the backup application 1021 or 1041 is configured to identify at least a first VM of the group of VMs based on a threshold indicating a probability of failure of creating a snapshot for the at least first VM at a first level of consistency. In some implementations, the first level of consistency is an application consistency. For example, the backup application can identify that creating a snapshot at the application consistency for VM 1031 of the group of VMs (VM 1031-1033 and 1051-1053) has a high probability of failure based on a threshold. In some implementations, the backup application is configured to allocate a plurality of weights to each of the VMs in the group including the at least first VM. The plurality of weights indicates a plurality of attributes related to the probability of failure. The backup application is further configured to calculate a summation of the plurality of weights and compare the summation to the threshold. For example, if the summation of the plurality of weights allocated to a VM 1031 is higher than the threshold, the backup application can determine that that creating a snapshot at the application consistency for VM 1031 has a high probability of failure. Allocating the plurality of weights to VMs will be described in greater detail with reference to FIG. 2 below.

After the at least first VM is identified, in some implementations, the backup application 1021 or 1041 is configured to remove the at least first VM from the group of VMs such that the group of VMs includes first remaining VMs. For example, the backup application can remove VM 1031 from the group of VMs. After VM 1031 is removed from the group, the group of VMs includes first remaining VMs 1032-1033 and 1051-1053. In some implementations, the backup application is configured to create a different group for the at least first VM. For example, the backup application can create a new group and place the VM 1031 into the new group.

After the at least first VM is removed from the group of VMs, in some implementations, the backup application 1021 or 1041 is configured to initiate creating a first snapshot for the first remaining VMs at the first level of consistency. For example, the backup application can start the backup process or operation to attempt to create a snapshot for the remaining VMs 1032-1033 and 1051-1053 in the group at an application consistency. The backup application can use the "CreateSnapshot" method provided by Microsoft to attempt to create the snapshot. In some implementations, the backup application is configured to identify a failure of creating the first snapshot for at least a second VM of the first remaining VMs. For example, the backup application can identify a failure of creating the snapshot at the application consistency for VM 1051. In some implementations, the backup application is configured to receive information indicating a reason of the failure. For example, the backup application can receive information indicating that the reason of the failure is because it is impossible to create a snapshot at the application consistency for VM 1051.

In some implementations, the backup application 1021 or 1041 is configured to remove the at least second VM from the first remaining VMs such that the group of VMs includes one or more second remaining VMs. For example, the backup application can remove VM 1051 from the group of VMs (including first remaining VMs 1032-1033 and 1051-1053). After VM 1051 is removed from the group, the group of VMs now includes second remaining VMs 1032-1033 and 1052-1053. In some implementations, the backup application is configured to move the at least second VM to the different group created for the at least first VM as described above. For example, the backup application can place the VM 1051 into the new group created for VM 1031.

After the at least second VM is removed from the group of VMs, in some implementations, the backup application 1021 or 1041 is configured to create a second snapshot for the one or more second remaining VMs at the first level of consistency. For example, the backup application can retry to create a snapshot for second remaining VMs 1032-1033 and 1052-1053 at the application consistency. In this example, the backup application may successfully create the snapshot for second remaining VMs 1032-1033 and 1052-1053 at the application consistency because VM 1031 having a high probability of failure and VM 1051 causing failure have been removed from the group of VMs.

In some implementations, the backup application 1021 or 1041 is configured to create a third snapshot for the at least first VM or the at least second VM at a second level of consistency. In some implementations, the second level of consistency is a crash consistency. For example, the backup application can create a snapshot for VM 1031 and/or 1051 at the crash consistency.

In other examples, the VMs (e.g., VMs 1031-1033 and 1051-1053) hosted by multiple hypervisors (hypervisors 102 and 104) in a cluster may form multiple groups of VMs. For example, VMs 1031-1033 may form a group and VMs 1051-1053 may form another group of VMs. The group that a VM belongs to can be stored as part of data structure of the VM. Each group can be referred to using its name and UniqueID. A group of VMs can be an entity that the backup application 1021 or 1041 can create a snapshot for the entire group. When there are multiple groups of VMs, the backup application can perform the above process described with reference to FIG. 1 for each group. For example, the backup application can identify and remove VM 1031 from the group of VMs 1031-1033 based on the threshold, and identify and remove VM 1032 from the first remaining VMs 1032-1033 in the group due to the failure of VM 1032 when attempting to create a snapshot for the first remaining VMs 1032-1033 at the application consistency, and successfully create a snapshot for the second remaining VM 1033 in the group at the application consistency.

The server 101 may include any of a number of different subsystems (each an individual system) for performing one or more functions or operations as described herein. The subsystems may be co-located or directly coupled to one another, or in some examples, various ones of the subsystems may communicate with one another across one or more computer networks. It should also be understood that the server may include one or more additional or alternative subsystems than those shown in FIG. 1. For example, the server 101 can include server hardware such as CPU, memory, network interface controller (NIC), hard disk and/or other hardware components. With the server hardware, the server can support one or more hypervisors such as the hypervisors 102 and 104. In one example, the server 101 can be deployed in a cloud environment as a server of a cloud service provider.

Figure 2:
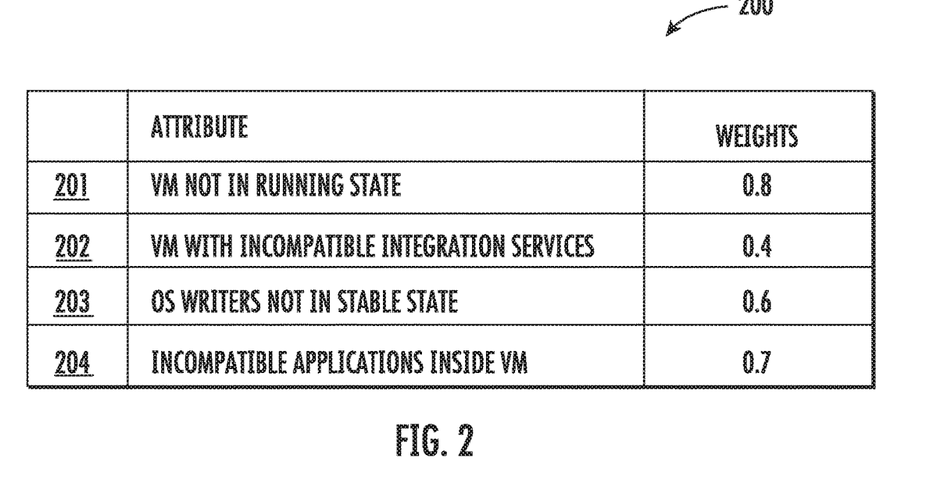
FIG. 2 illustrates a table including attributes with corresponding weights for a group of VMs, according to some example implementations.

There can be multiple factors or attributes indicating that a VM may not be applicable for application consistency due to a high probability of failure. FIG. 2 illustrates a table 200 including attributes with corresponding weights for a group of VMs, according to some example implementations. As shown, in one example, table 200 can list multiple attributes related to the probability of failure when creating a snapshot for a VM at the application consistency. For example, attribute 201 can indicate that a VM may not be applicable for application consistency if the VM is not in running state (e.g., the VM is in saved state, power off, migrating, busy etc.). Attribute 202 can indicate that a VM may not be applicable for application consistency if the VM has incompatible integration services. Attribute 202 may include certain Linux distributions and certain Windows based VMs with non-updated integration services. Attribute 203 can indicate that a VM may not be applicable for application consistency if writers of the operating system (OS) of the VM are not in a stable state or the OS has unsupported versions. Attribute 204 can indicate that a VM may not be applicable for application consistency if there are incompatible applications running inside the VM. Each of the attributes can be assigned a corresponding weight. For example, attribute 201 can be assigned a weight of 0.8. The weight may be determined based on a probability of failure of creating a snapshot for a VM at the application consistency caused by the attribute.

In one example, before the backup application 1021 or 1041 attempts to create a snapshot for the group of VMs (VMs 1031-1033 and 1051-1053) at the application consistency, the backup application can allocate the plurality of weights in table 200 to each of the VMs in the group. The backup application can determine a total weight (summation of the plurality of weights) for each of the VMs in the group. If the total weight for a VM exceeds a threshold value, the VM can be identified, separated and placed in a different group or in an invalid target list. For example, the threshold value is 2 indicating a 80% probability of failure, and the weights in FIG. 2 are allocated for VM 1031 with a total weight of 2.5 (0.8+0.4+0.6+0.7). The backup application can identify that creating a snapshot for VM 1031 at the application consistency has a high probability (>80%) of failure and remove VM 1031 from the group of VMs, as described above.

Figure 3:
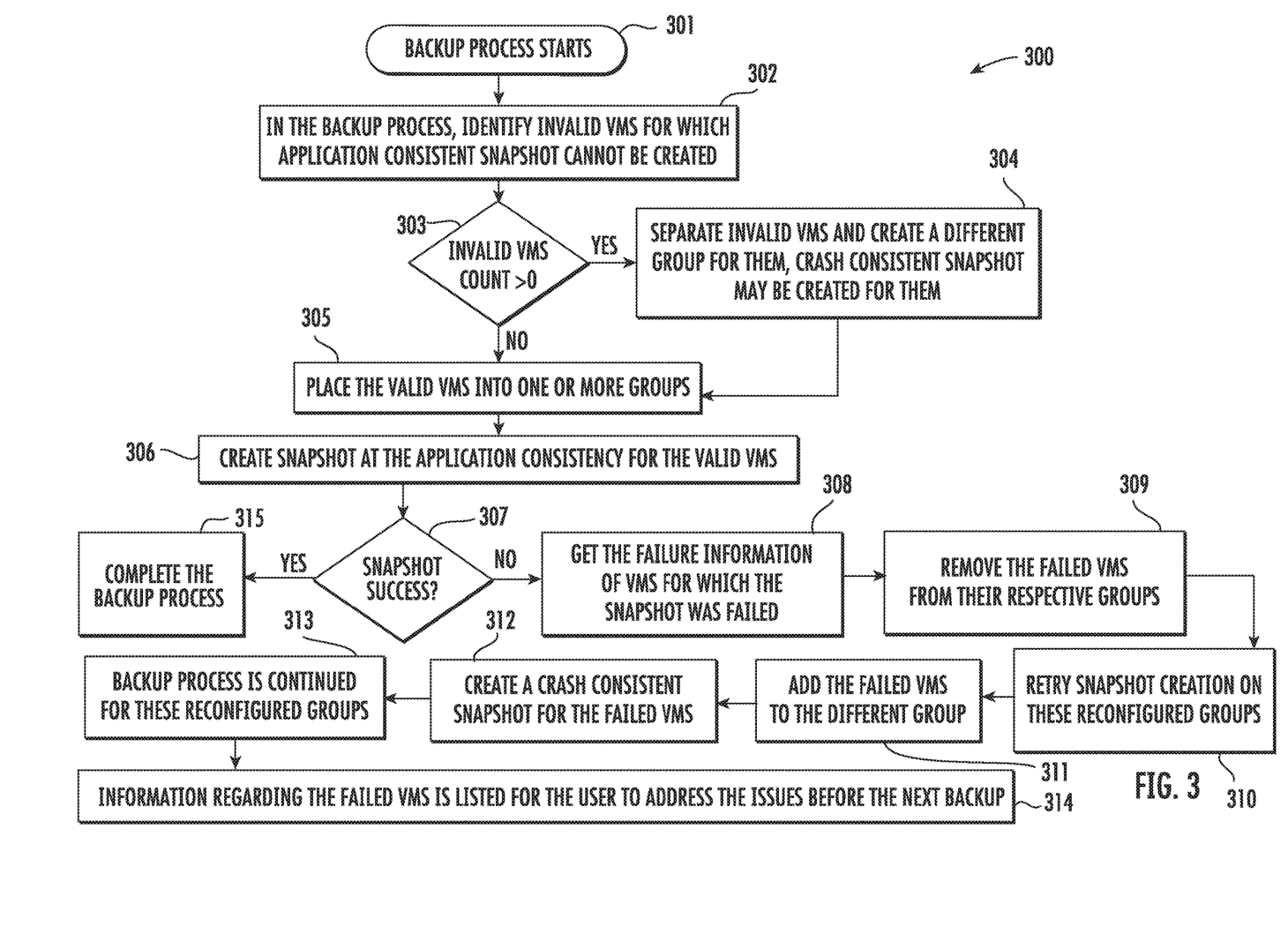
FIG. 3 illustrates a flowchart of performing backup for one or more groups of VMs, according to some example implementations.

FIG. 3 illustrates a flowchart 300 of performing backup for one or more groups of VMs, according some example implementations. As shown, a backup process starts at block 301. At block 302, the backup application can identify invalid VMs for which application consistent snapshot cannot be created in the back up process. For example, the backup application can identify VMs that have a high probability of failure for creating a snapshot at the application consistency based on the threshold, as described above. At block 303, if the backup application determines that there is at least one invalid VM (invalid VM count>0), the flowchart goes to block 304. At block 304, the backup application can separate the invalid VMs (e.g., VM 1031) and create a different group for the invalid VMs. The backup application may create a snapshot at a crash consistency for the invalid VMs.

In one example, if all VMs (e.g., VMs 1031-1033 and 1051-1053) are valid VMs for creating a snapshot at the application consistency, the flowchart 300 goes from block 303 to block 305. In another example, after the invalid VMs (e.g., VM 1031) are removed, all remaining VMs (e.g., VMs 1032-1033 and 1051-1053) are valid VMs, the flowchart 300 goes from block 304 to block 305. At block 305, the backup application can place the valid VMs into one or more groups. The group that a VM belongs to can be stored as part of data structure of the VM as described above. At block 306, the backup application can attempt to create a snapshot at the application consistency for the valid VMs in the one or more groups. In one example, the backup application can use the "CreateSnapshot" method provided by Microsoft to attempt to create the snapshot. At block 307, if the backup application determines that the snapshot at the application consistency is successfully created for the valid VMs, the flowchart 300 goes from block 307 to block 315 to complete the backup process.

On the other hand, at block 307, if the backup application 1021 or 1041 determines that the snapshot at the application consistency is not successfully created for the valid VMs, the flowchart 300 goes from block 307 to block 308. At block 308, the backup application can identify the failed VMs (e.g., VM 1051) and get the failure information (e.g., failure/error codes) of the failed VMs. At block 309, the backup application can remove the failed VMs from their respective groups. In one example, each group may have some attributes such as hostname of the hypervisor for the group and the VMs that comprise the group. Using these attributes, the failed VMs can be removed from the groups.

At block 310, the backup application can retry the snapshot creation at the application consistency for the VMs in the reconfigured groups, i.e., after the failed VMs are removed from the groups. At block 311, the backup application can add the failed VMs to the different group created for the invalid VMs as described at block 304. At block 312, the backup application can create a snapshot at a crash consistency for the failed VMs. At block 313, the backup application can continue the backup process for the reconfigured groups. The backup application can successfully create a snapshot at the application consistency for the remaining VMs (VMs 1032-1033 and 1052-1053) in the reconfigured groups. At block 314, the backup application can list information regarding the failed VMs (failure/error codes) for the user to address the issues causing the failure before next backup.

Based on the regarding the failed VMs (failure/error codes), the user can address the issues causing the failure. For example, if the failure is due to outdated integration services, the user can update the integration services for the failed VMs. In one example, the VMs may fail in the creation of application consistent snapshot but succeed in the creation of crash consistent snapshot, the user can check the reasons of the failure (based on logging information) and rectify them to allow for application consistent snapshot. In another example, the VMs may fail in both kinds of snapshot, then the user may need to check the issues and set the attributes accordingly. In a further example, for a Linux VM, even if the VM is in proper state, Microsoft does not support an application consistent snapshot. So the user can set that only a crash consistent snapshot should be created for it.

Figure 4:
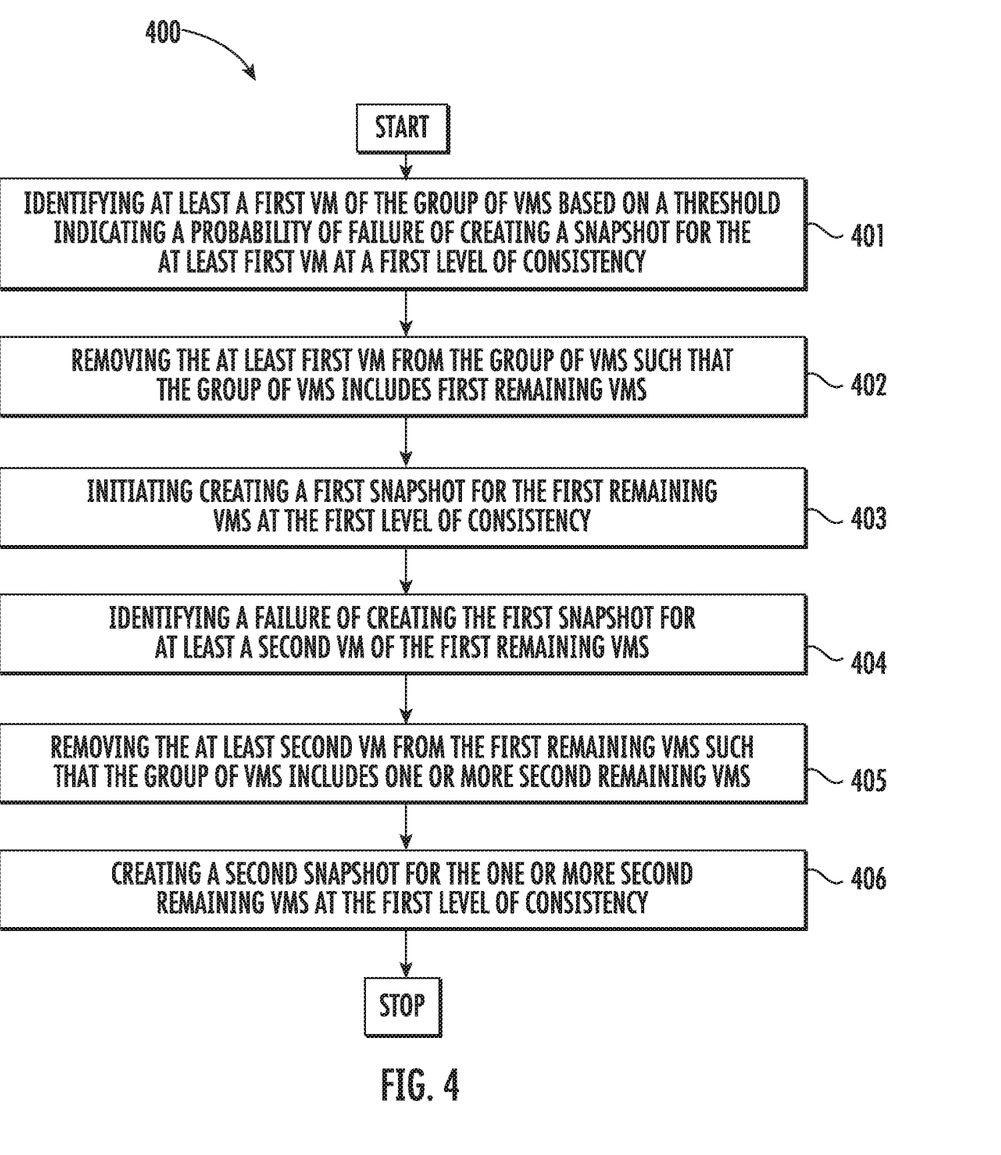
FIG. 4 is a flowchart illustrating various operations in a method of performing backup for a group of VMs, according to some example implementations.

FIG. 4 illustrates a flowchart 400 of performing backup for a group of VMs, according to some example implementations. At block 401, the method includes identifying at least a first VM of the group of VMs based on a threshold indicating a probability of failure of creating a snapshot for the at least first VM at a first level of consistency. At block 402, the method includes removing the at least first VM from the group of VMs such that the group of VMs includes first remaining VMs. At block 403, the method includes initiating creating a first snapshot for the first remaining VMs at the first level of consistency. At block 404, the method includes identifying a failure of creating the first snapshot for at least a second VM of the first remaining VMs. At block 405, the method includes removing the at least second VM from the first remaining VMs such that the group of VMs includes one or more second remaining VMs. At block 406, the method includes creating a second snapshot for the one or more second remaining VMs at the first level of consistency.

The process in the flowchart 400 can be further explained by taking an example of a group of 10 VMs (VM1-VM10) that need to be backed up. The backup application 1021 or 1041 can perform analysis based on known failure cases and compute the total weight for each VM. Assuming that the total weights of VM1 and VM10 exceed the threshold. The backup application can identify VM1 and VM10 as invalid VMs with a high probability of failure for creating a snapshot at the application consistency and remove VM1 and VM 10 from the group. Now the group of VMs includes first remaining 8 VMs, i.e., VM2-VM9. The backup application can attempt to create a snapshot for VM2-VM9 at the application consistency level. The backup application can identify a failure of creating the snapshot at the application consistency level for VM2 and remove VM2 from the group. Now the group of VMs includes second remaining 7 VMs, i.e., VM3-VM9. The backup application can retry to create a snapshot for the second remaining VM3-VM9 at the application consistency. In this example, the backup application may successfully create the snapshot for second remaining VM3-VM9 at the application consistency because VM1 and VM10 having a high probability of failure and VM2 causing failure have been removed from the group of VMs.

In the above example, the backup application 1021 or 1041 can also create a new group for VM1 and VM10 if the backup application determines that a snapshot at a crash consistency can be created for VM1 and VM10. If it is possible to create a snapshot at a crash consistency for VM2, the backup application can move VM2 to the new group and attempt to create a snapshot at the crash consistency for VM1, VM2, and VM10. If a snapshot at a crash consistency cannot be created for VM1 and VM10, then VM1 and VM10 can be excluded from the backup process. Also, based on the reason of the failure of creating the snapshot for VM 2 at the application consistency level, if the backup application determines that a snapshot at a crash consistency cannot be created for VM 2 either (e.g., VM 2 is failed due to a configuration or setup issue), the backup application can mark VM2 as failed and notify the reason to the user (e.g., as part of the log) so the user can rectify the failure.

Figure 5:
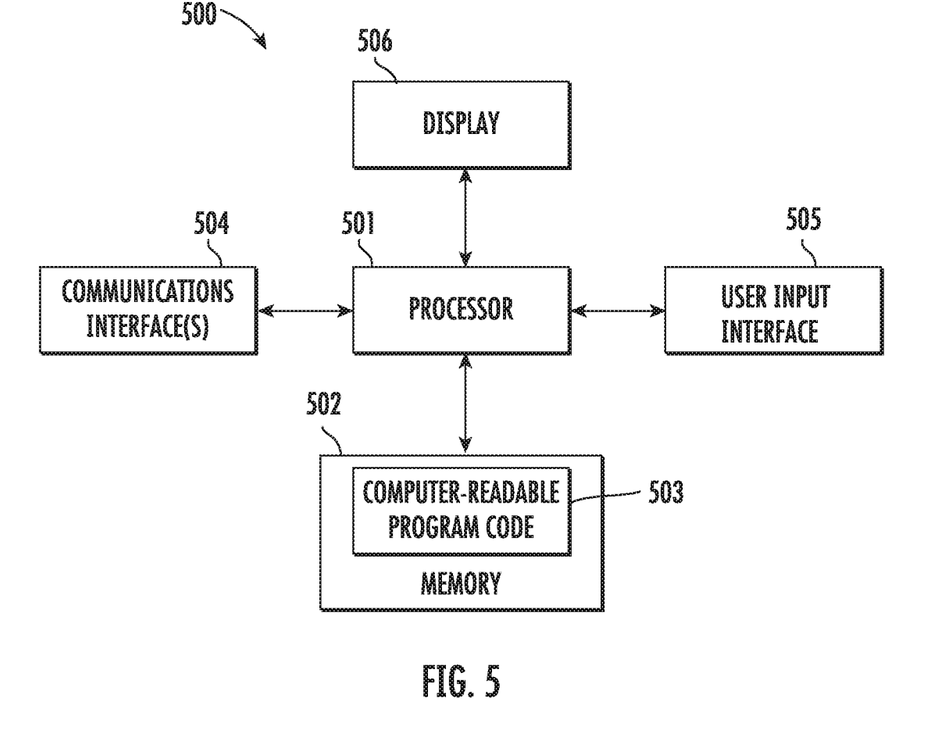
FIG. 5 illustrates an apparatus according to some example implementations.

FIG. 5 illustrates an apparatus 500 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 501 (e.g., processing circuitry) connected to a memory 502 (e.g., storage device). In some examples, the apparatus 500 implements the server or system 101.

The processor 501 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 502 (of the same or another apparatus).

The processor 501 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 502 is generally any piece of computer hardware that is capable of storing information such as, for example, data, computer programs (e.g., computer-readable program code 503) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 502, the processor 501 may also be connected to one or more interfaces for displaying, transmitting and/or receiving information. The interfaces may include a communications interface 504 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 506 and/or one or more user input interfaces 505 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 501 and a computer-readable storage medium or memory 502 coupled to the processor, where the processor is configured to execute computer-readable program code 503 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of performing backup for a group of virtual machines (VMs), the method comprising:
    grouping a plurality of VMs to form the group of VMs and allow taking a collective snapshot of the group of VMs;
    identifying at least a first VM of the group of VMs based on a threshold indicating a probability of failure of creating a snapshot for the at least first VM at a first level of consistency;
    removing the at least first VM from the group of VMs based on the threshold indicating the probability of failure of creating the snapshot for the at least first VM at the first level of consistency such that the group of VMs includes first remaining VMs and excludes the at least first VM;
    initiating creating a first collective snapshot for the first remaining VMs at the first level of consistency;
    identifying a failure of creating the first collective snapshot for at least a second VM of the first remaining VMs;
    removing the at least second VM from the first remaining VMs such that the group of VMs includes one or more second remaining VMs; and
    creating a second collective snapshot for the one or more second remaining VMs at the first level of consistency.

2. The method of claim 1, wherein identifying the at least first VM of the group of VMs includes:
    allocating a plurality of weights to the at least first VM, the plurality of weights indicating a plurality of attributes related to the probability of failure;
    calculating a summation of the plurality of weights; and
    comparing the summation to the threshold.

3. The method of claim 1, wherein the group of VMs is hosted on one or more Microsoft Hyper-V hypervisors including feature of resilient change tracking (RCT).

4. The method of claim 1, wherein identifying the failure of creating the first snapshot includes receiving information indicating a reason of the failure.

5. The method of claim 1, wherein removing the at least first VM from the group of VMs includes creating a different group for the at least first VM, and removing the at least second VM from the first remaining VMs includes moving the at least second VM to the different group.

6. The method of claim 1, further comprising creating a third snapshot for the at least first VM or the at least second VM at a second level of consistency.

7. The method of claim 6, wherein the first level of consistency is an application consistency, and the second level of consistency is a crash consistency.

8. An apparatus for performing backup for a group of virtual machines (VMs), the apparatus comprising a processor and a memory storing executable instructions that, in response to execution by the processor, cause the apparatus to at least:
- group a plurality of VMs to form the group of VMs and allow taking a collective snapshot of the group of VMs;
- identify at least a first VM of the group of VMs based on a threshold indicating a probability of failure of creating a snapshot for the at least first VM at a first level of consistency;
- remove the at least first VM from the group of VMs based on the threshold indicating the probability of failure of creating the snapshot for the at least first VM at the first level of consistency such that the group of VMs includes first remaining VMs and excludes the at least first VM;
- initiate creating a first collective snapshot for the first remaining VMs at the first level of consistency;
- identify a failure of creating the first collective snapshot for at least a second VM of the first remaining VMs;
- remove the at least second VM from the first remaining VMs such that the group of VMs includes one or more second remaining VMs; and
- create a second collective snapshot for the one or more second remaining VMs at the first level of consistency.

9. The apparatus of claim 8, wherein the apparatus being caused to identify the at least first VM of the group of VMs includes being caused to:
- allocate a plurality of weights to the at least first VM, the plurality of weights indicating a plurality of attributes related to the probability of failure;
- calculate a summation of the plurality of weights; and
- compare the summation to the threshold.

10. The apparatus of claim 8, wherein the group of VMs is hosted on one or more Microsoft Hyper-V hypervisors including feature of resilient change tracking (RCT).

11. The apparatus of claim 8, wherein the apparatus being caused to identify the failure of creating the first snapshot includes being caused to receive information indicating a reason of the failure.

12. The apparatus of claim 8, wherein the apparatus being caused to remove the at least first VM from the group of VMs includes being caused to create a different group for the at least first VM, and the apparatus being caused to remove the at least second VM from the first remaining VMs includes being caused to move the at least second VM to the different group.

13. The apparatus of claim 8, wherein the memory stores further executable instructions that, in response to execution by the processor, cause the apparatus to further at least:
- create a third snapshot for the at least first VM or the at least second VM at a second level of consistency.

14. The apparatus of claim 13, wherein the first level of consistency is an application consistency, and the second level of consistency is a crash consistency.

15. A computer-readable storage medium for performing backup for a group of virtual machines (VMs), the computer-readable storage medium being non-transitory and having computer-readable program code stored therein that in response to execution by a processor, causes an apparatus to at least:
- group a plurality of VMs to form the group of VMs and allow taking a collective snapshot of the group of VMs;
- identify at least a first VM of the group of VMs based on a threshold indicating a probability of failure of creating a snapshot for the at least first VM at a first level of consistency;
- remove the at least first VM from the group of VMs based on the threshold indicating the probability of failure of creating the snapshot for the at least first VM at the first level of consistency such that the group of VMs includes first remaining VMs and excludes the at least first VM;
- initiate creating a first collective snapshot for the first remaining VMs at the first level of consistency;
- identify a failure of creating the first collective snapshot for at least a second VM of the first remaining VMs;
- remove the at least second VM from the first remaining VMs such that the group of VMs includes one or more second remaining VMs; and
- create a second collective snapshot for the one or more second remaining VMs at the first level of consistency.

16. The computer-readable storage medium of claim 15, wherein the apparatus being caused to identify the at least first VM of the group of VMs includes being caused to:
- allocate a plurality of weights to the at least first VM, the plurality of weights indicating a plurality of attributes related to the probability of failure;
- calculate a summation of the plurality of weights; and
- compare the summation to the threshold.

17. The computer-readable storage medium of claim 15, wherein the group of VMs is hosted on one or more Microsoft Hyper-V hypervisors including feature of resilient change tracking (RCT).

18. The computer-readable storage medium of claim 15, wherein the apparatus being caused to remove the at least first VM from the group of VMs includes being caused to create a different group for the at least first VM, and the apparatus being caused to remove the at least second VM from the first remaining VMs includes being caused to move the at least second VM to the different group.

19. The computer-readable storage medium of claim 15, having further computer-readable program code stored therein that in response to execution by the processor, causes the apparatus to further at least:
- create a third snapshot for the at least first VM or the at least second VM at a second level of consistency.

20. The computer-readable storage medium of claim 19, wherein the first level of consistency is an application consistency, and the second level of consistency is a crash consistency.

\* \* \* \* \*